(12) United States Patent
Krishnamurthy et al.

(10) Patent No.: US 12,737,571 B2
(45) Date of Patent: Sep. 15, 2026

(54) SYSTEMS AND METHODS TO USE GENERATIVE AI FOR EASY CONFIGURATION OF ADVANCED FEATURES IN MV/FIS CAMERAS AND ASSOCIATED JOB BUILDER APPLICATION

(71) Applicant: Zebra Technologies Corporation, Lincolnshire, IL (US)

(72) Inventors: Adithya H. Krishnamurthy, Plainview, NY (US); Matthew M. Degen, Ridge, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 85 days.

(21) Appl. No.: 18/968,512

(22) Filed: Dec. 4, 2024

(65) Prior Publication Data

US 2026/0154516 A1 Jun. 4, 2026

(51) Int. Cl.

| | |
|---|---|
| ***G06K 7/10*** | (2006.01) |
| ***G06K 7/14*** | (2006.01) |
| ***G06V 30/148*** | (2022.01) |

(52) U.S. Cl.

CPC ........... *G06K 7/10227* (2013.01); *G06K 7/14* (2013.01); *G06V 30/153* (2022.01)

(58) Field of Classification Search

CPC ..... G06K 7/10227; G06K 7/14; G06V 30/153

See application file for complete search history.

(56) References Cited

U.S. PATENT DOCUMENTS

| | | | | |
|---|---|---|---|---|
| 2023/0030779 | A1 * | 2/2023 | DeLuca | G06V 10/945 |
| 2024/0402999 | A1 * | 12/2024 | Chen | G06F 8/30 |
| 2024/0419658 | A1 * | 12/2024 | Trache | H04L 67/306 |

* cited by examiner

*Primary Examiner* — Omeed Alizada

(57) ABSTRACT

A method including receiving, at a trained machine learning model of a Machine Vision (MV) or Fixed Industrial Scanner (FIS) graphical user interface (GUI)-based computer application, a system instruction file; receiving, at the trained machine learning model of the MV or FIS GUI-based computer application, a current MV or FIS barcode scanning job configuration; receiving a prompt including a natural language query regarding the current MV or FIS barcode scanning job configuration; generating, by processing the prompt and the system instruction file and using the trained machine learning model, a new barcode scanning job configuration corresponding to the prompt and a response to the prompt; updating, the current MV or FIS barcode scanning job configuration based on the new barcode scanning job configuration; and causing the response to the prompt to be displayed in a GUI of the MV or FIS GUI-based computer application.

14 Claims, 7 Drawing Sheets

502

Advanced Filtering and Formatting
BDF Display Value:072785032415

ManyCode

Rule 1

Required Input Decode Count: 1
Required Output Decode Count: 1 to

Decode Output Ordering
◉ Same As Input
○ By Filter Order

Decode Output Filtering
◉ Output All Decodes
○ Output All Decodes If Any Decode Passes Filter
○ Follow Per-Filter Output Settings Formatting
ManyCode String Delimiter NONE
Prefix Suffix Rule 2

Required Input Decode Count: 1
Required Output Decode Count: 1 to

Decode Output Odering
◉ Same As Input
○ By Filter Order

Decode Output Filtering
◉ Output All Decodes
○ Output All Decodes If Any Decode Passes Filter

FIG. 5 (Continued)

SYSTEMS AND METHODS TO USE GENERATIVE AI FOR EASY CONFIGURATION OF ADVANCED FEATURES IN MV/FIS CAMERAS AND ASSOCIATED JOB BUILDER APPLICATION

TECHNICAL FIELD

The present disclosure is generally directed to methods and systems for using generative artificial intelligence (AI) to generate a machine vision (MV) or fixed industrial scanner (FIS) barcode scanning job configuration.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Machine vision or fixed industrial scanner applications may include many settings that can be adjusted to meet the needs of a particular machine vision or fixed industrial scanner job. For example, a job to scan a barcode may include settings that specify how a barcode should be interpreted and the format of an output string produced by scanning the barcode. Such settings may include the format of the barcode, the length of the output string, the number of characters to be included in from the decoded barcode, the order in which decoded barcode strings are outputted, a format of the output string, and other filters and formats. However, the multitude of settings makes adjusting the settings of job to achieve a desired output string difficult. Thus, there exists an opportunity for generating machine vision or fixed industrial scanner job configurations with machine learning and generative artificial intelligence.

BRIEF SUMMARY

In one aspect, a method includes receiving, at a trained machine learning model of a Machine Vision (MV) or Fixed Industrial Scanner (FIS) graphical user interface (GUI)-based computer application, a system instruction file; receiving, at the trained machine learning model of the MV or FIS GUI-based computer application, a current MV or FIS barcode scanning job configuration; receiving a prompt including a natural language query regarding the current MV or FIS barcode scanning job configuration; generating, by processing the prompt and the system instruction file and using the trained machine learning model, a new barcode scanning job configuration corresponding to the prompt and a response to the prompt; updating the current MV or FIS barcode scanning job configuration based on the new barcode scanning job configuration; and causing the response to the prompt to be displayed in a GUI of the MV or FIS GUI-based computer application.

BRIEF DESCRIPTION OF THE FIGURES

The figures described below depict various implementations of the system and methods disclosed therein. It should be understood that each figure depicts one implementation of a particular implementation of the disclosed system and methods, and that each of the figures is intended to accord with a possible implementation thereof. Further, wherever possible, the following description refers to the reference numerals included in the following figures, in which features depicted in multiple figures are designated with consistent reference numerals.

The figures depict preferred implementations for purposes of illustration only. One skilled in the art will readily recognize from the following discussion that alternative implementations of the systems and methods illustrated herein may be employed without departing from the principles of the invention described herein.

DETAILED DESCRIPTION

Overview

The present techniques provide systems and methods using machine learning for, inter alia, controlling an imaging device. The methods and systems include, for example, receiving, at a trained machine learning model of a Machine Vision (MV) or Fixed Industrial Scanner (FIS) graphical user interface (GUI)-based computer application, a system instruction file; receiving, at the trained machine learning model of the MV or FIS GUI-based computer application, a current MV or FIS barcode scanning job configuration; receiving a prompt including a natural language query regarding the current MV or FIS barcode scanning job configuration; generating, by processing the prompt and the system instruction file and using the trained machine learning model, a new barcode scanning job configuration corresponding to the prompt and a response to the prompt; updating the current MV or FIS barcode scanning job configuration based on the new barcode scanning job configuration; and causing the response to the prompt to be displayed in a GUI of the MV or FIS GUI-based computer application.

As described above, a barcode scanning job may include a multitude of settings, such that selecting which settings to select to achieve a desired output string may be difficult. Currently, a user must manually adjust the settings by interacting with a GUI of a MV or FIS GUI-based computer application.

To overcome these technical hurdles, the present application describes systems and methods that utilize machine learning to update a barcode scanning job configuration. The techniques of the present disclosure provide a technical improvement over conventional techniques at least by improving the functionality of a computing device (e.g., server executing the machine learning model).

In particular, the machine learning model may update a barcode scanning configuration by directly modifying user interface controls in an MV or FIS GUI-based application, which improves accuracy as the machine learning model is prevented from generating an invalid configuration. Efficiency is improved because the machine learning model can determine and learn which combination of settings forms a desired configuration, reducing the use of resources from repeatedly generating and executing barcode scanning jobs to test configurations. Efficiency is also improved because the amount of resources used are reduced, as the machine learning model always has access to a configuration and can update the configuration instead of starting from scratch and the user needing to describe the current configuration to the machine learning model each time. Thus, the present disclosure describes improvements in the functioning of the computer itself because the computing device more efficiently and accurately generates barcode scanning job configurations.

Example Environment

Figure 1:
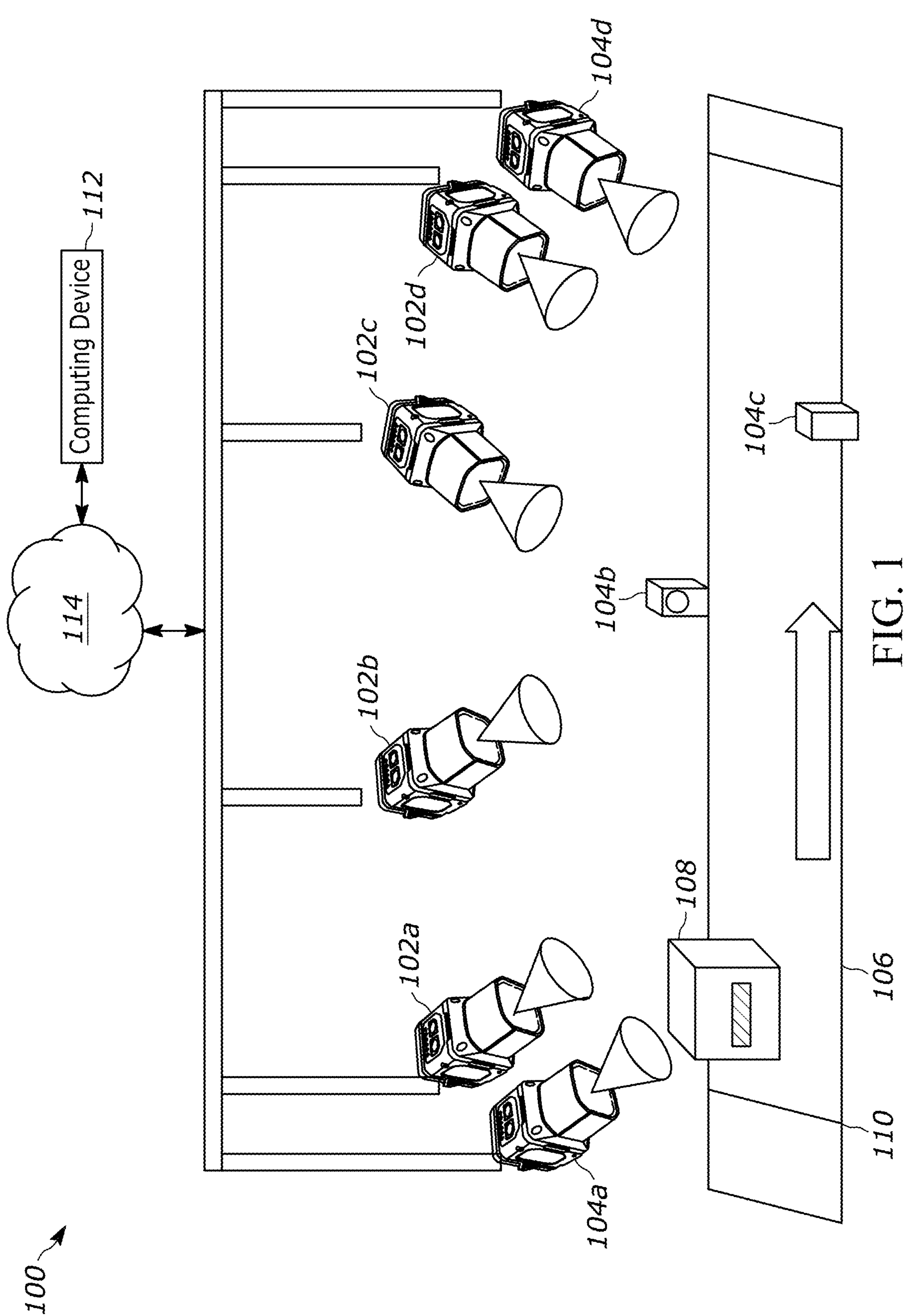
FIG. 1 depicts an example environment in which systems and imaging devices may be utilized, in accordance with embodiments described herein.

FIG. 1 depicts an example environment 100 in which imaging devices may be utilized, in accordance with embodiments described herein. The example environment 100 may generally be an industrial setting that includes different sets of imaging devices 102/104 positioned over or around a conveyor belt 106. The imaging devices 102*a-d* may be machine vision cameras each positioned at a different location along the conveyor belt 106 and each having a different orientation relative to the conveyor belt 106, where the machine vision cameras 102*a-d* are configured to capture image data over a corresponding field of view. The imaging devices 102*a-d* may be machine vision cameras.

The imaging devices 104*a-d* may be fixed industrial scanners configured to capture image data of a corresponding field of view. Imaging devices 104*a-d* can be configured to capture image data such as a barcode of a target object 108 on a conveyor belt 106. The belt 106 may carry a target object 108 across an entry point 110 where a set of initial imaging devices 102*a-d* and 104*a-d* are located. The imaging devices 102*a-d* and 104*a-d* capture images of the object 108 along the conveyor belt 106. A computing device 112 may be communicatively coupled through a network 114 to each of the imaging devices 102*a-d* and 104*a-d*, so that the computing device 112 may receive and analyze the images from the imaging device 102*a-d* and 104*a-d*. In some embodiments, the computing device 112 may configure and control the imaging device 102*a-d* and 104*a-d* to capture images.

The set of imaging devices 102*a-d* and 104*a-d* may be organized in an array or other manner that allows capturing images along the entire working length of a belt 106 and may be arranged in a leader/follower configuration with a leader device (not shown), that may be configured to trigger the fixed industrial scanners 104*a-d* to capture image data of the target object 108, organize results from each machine vision camera's image capture/inspection, and transmit the results and/or the captured images to the computing device 112. Each imager of the imaging devices 102 and 104 stores a program for execution (e.g., a "job," "executable code") that includes information regarding the respective imagers image-capture parameters, such as focus, exposure, gain, specifics on the type of symbology targeted for decoding, or specific machine vision inspection steps.

It should be appreciated that, while four machine vision cameras 102*a-d* and four fixed industrial scanners 104*a-d* are shown, any suitable number of devices may be used in order to capture all images of the target object 108, take multiple image captures of the target object 108, and/or otherwise capture sufficient image data of the target object 108.

Example Processing Platform

Figure 2:
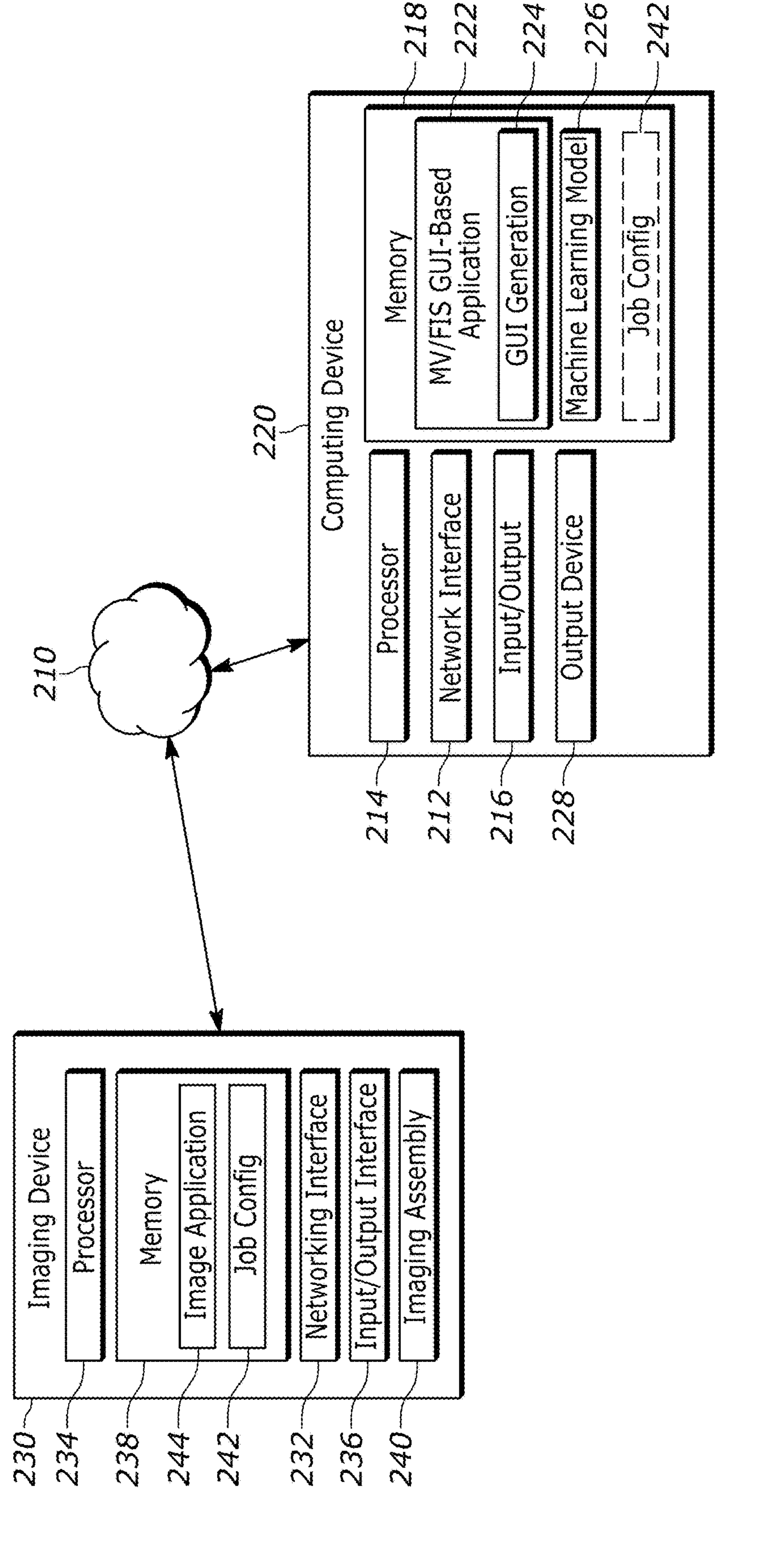
FIG. 2 depicts a block diagram of an example logic circuit for implementing example methods and/or operations described herein.

FIG. 2 is a block diagram depicting an example processing platform 200 for implementing example methods and/or operations described herein, according to embodiments. The example processing platform 200 includes a network 210 (e.g., the network 114), a computing device 220 (e.g., the computing device 112) and an imaging device 230 (e.g., a machine vision camera 102*a-d*, a fixed industrial scanner 104*a-d*). Although the processing platform 200 is shown to include one network 210, one computing device 220, and one imaging device 230, it should be understood that the processing platform 200 may include additional, fewer, and/or alternate components, and may be configured to perform additional, fewer, or alternate actions, including components/actions described herein. Similarly, it should likewise be understood that the computing device 220 and/or imaging device 230 may include additional, fewer, and/or alternate components, and also may be configured to perform additional, fewer, and/or alternate actions, including the components and/or actions described herein. For example, the processing platform 200 may include a plurality of imaging devices 230, all of which may be interconnected via the network 210. Similarly, the computing device 220 may include multiple processors 214, and may not include an output device 228. Furthermore, it should be appreciated that additional and/or alternative connections between components shown in FIG. 2 may be implemented. As just one example, the computing device 220 and the imaging device 230 may be connected via a direct communication link (not shown in FIG. 2) instead of, or in addition to, via the network 210.

The network 210 may include at least one communication and/or data network to communicatively couple components of the processing platform 200, such as enabling bidirectional communication between the computing device 220 (e.g., via the network interface 212) and the imaging device 230, and/or any other suitable device. The network 210 may comprise any suitable network or networks, including a local area network (LAN), wide area network (WAN), Internet, or combination thereof. For example, the network 210 may include a wireless cellular service (e.g., 4G, 5G, etc.). In one aspect, the network 210 may comprise a cellular base station, such as cell tower(s), communicating to the one or more components of the processing platform 200 via wired/wireless communications based on any one or more of various mobile phone standards, including NMT, GSM, CDMA, UMMTS, LTE, 5G, or the like. Additionally, or alternatively, the network 210 may comprise one or more wired and/or wireless data buses, modems, routers, switches, or other such connection points communicating to the components of the processing platform 200, which may include wired and/or wireless communications based on any one or more of various standards, including by non-limiting example, IEEE standards (e.g., 802.3, 802.11b/g/n/ac/ax, etc.), Bluetooth, and/or the like.

The computing device 220 may include the network interface 212, a processor 214, an input/output (I/O) interface 216, a memory 218, and an output device 228, any and/or all of which may be interconnected via an address/data bus or otherwise communicatively connected.

The network interface 212 may enable communication by the computing device 220 via the network 210. The example network interface 212 may include any suitable type of communication interface(s) (e.g., wired and/or wireless interfaces) and be configured to operate in accordance with any suitable protocol(s). For example, in some embodiments, network interface 212 may transmit data or information (e.g., image data, payloads, etc.) between remote processor(s), the imaging device 230, and/or other components.

The processor 214 may include one or more processors such as a microprocessor (μP), microcontroller, central processing units (CPU) and/or graphics processing unit (GPU) and/or any suitable type of processor. The processor 214 may include one or more logical processors (e.g., virtual execution unit(s) having one or more threads) and/or physical processors (e.g., hardware execution units having one or more cores) and may include multitasking and/or parallel processing. The processor 214 may control overall operations of the computing device 220. For example, the processor 214 may interact with the memory 218 to obtain, execute, and/or store data and/or instructions (e.g., machine-executable instructions) related to a Machine Vision (MV) or Fixed Industrial Scanner (FIS) graphical user interface (GUI)-based computer application 222, a machine learning model 224, the output device 228, and/or other component(s) of the computing device 220. Additionally, or alternatively, machine-readable instructions corresponding to the example operations described herein may be stored on one or more removable media (e.g., a compact disc, a digital versatile disc, removable flash memory, etc.) that may be communicatively coupled to the computing device 220 to provide access to the machine-readable instructions stored thereon. In particular, the instructions stored in the memory 218, when executed by the processor 214, may cause the processor 214 to generate a barcode scanning job configuration and respond to a prompt received via the I/O 216.

The I/O interface 216 may enable receipt of input (e.g., via a user interface) and/or communication of output data (e.g., to an output device). For example, the user may provide input to the computing device 220 using an interface device (e.g., a mouse, keyboard, touchscreen, etc.) to via the I/O interface 216.

The memory 218 may be accessible by the processor 214 (e.g., via a memory controller), and/or other components of the computing device 220 and/or the processing platform 200. The memory 218 may include one or more suitable storage media such as a magnetic storage device, a solid-state drive, random access memory, volatile memory, non-volatile (e.g., non-transitory) memory, a database, and/or any other suitable memory. The memory 218 may be a local memory included within the housing of the computing device 220, memory communicatively coupled to the computing device 220 (e.g., a database coupled via an address/data bus and/or the network 210). The memory 218 may contain instructions which may be executed by the processor 214. Such instructions may include one or more software applications, algorithms, modules, decoders, models, images for updating models, and/or other suitable instructions. The memory 218 may store an MV or FIS GUI-based computer application, a machine learning model 226, and a job configuration 228.

The MV or FIS GUI-based computer application 222, also called an MV or FIS GUI-based application herein, may perform one or more imaging tasks, such as building jobs (e.g., creating instructions) for a machine vision or fixed industrial scanner imaging devices, via the computing device 220. The MV or FIS GUI-based application 222 may include one or more settings, e.g., settings associated with performing an imaging task. For example, the MV or FIS GUI-based application 222 may render a GUI on a display (e.g., the output device 228 via the I/O interface 216) and/or other communicatively coupled device. A user may interact with the GUI to view and/or edit various settings in the MV or FIS GUI-based application 222, view images, input data, generate a barcode scanning job configuration 226, etc. The MV or FIS GUI-based application 222 may generate the barcode scanning job configuration 226 for configuring one or more settings of the MV or FIS GUI-based application 222, such as an input format of a scanned barcode, an output format of data contained in the scanned barcode, rules, actions, filters, and/or other suitable settings. The MV or FIS GUI-based application 222 may include a GUI generation module 224 which generates and updates a GUI that displays barcode scanning job configuration settings and other aspects of the MV or FIS GUI-based application 222 in graphical format on the output device 228.

The memory 218 may store a machine learning model 226. The machine learning model 226 may be, and/or include, one or machine learning models (e.g., a neural network), algorithms, and the like. In some aspects, the machine learning methods and algorithms may include, but are not limited to linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented machine learning methods and algorithms are directed toward at least one of a plurality of categorizations of machine learning, such as supervised learning, unsupervised learning, and reinforcement learning. In some aspects, the machine learning model 226 may be a generative model, a large language (e.g., large language model), and/or a multimodal machine learning model. In at least some implementations, the machine learning model 226 may be configured to receive a system instruction file, and a current MV or FIS barcode job scanning configuration, and a prompt input to generate a new barcode scanning job configuration corresponding to the prompt and a response to the prompt. The system instruction file provides the machine learning model 224 information such as company data, a MV or FIS application data, or a description of tasks to be performed by the machine learning model. It should be understood that although the model 224 is described as having certain functionalities, such functionalities may be performed by additional models.

The machine learning model 224 may be trained, retrained, and/or fine-tuned. In some embodiments, a base model may be configured to generate a response to a prompt. The base model may be fine-tuned to generate the model 224. The fine-tuning may cause the model 224 to perform a specific task such as generating a barcode scanning job configuration corresponding 242 to a prompt and a response to a prompt and/or to have better performance (e.g., generate output data faster, use fewer computing resources, etc.) generating a new barcode scanning job configuration and response to a prompt. One or more devices of the processing platform 200 may store, configure, update, and/or operate the model 224. For example, in some implementations, a server train, fine-tune, or otherwise configure the model 224. The computing device 220 may receive the configured model 224, store the model 224 in the memory 218), execute the model 224 (e.g., via the MV or FIS GUI-based application 222, etc.). In other implementations, the computing device 220 may configure, store, and/or operate the model 224.

The output device 228 may be configured to receive (e.g., via the I/O interface 216) and/or output data, such as images of the image data, a GUI MV or FIS GUI-based application 222, audio, video, texts, and/or other suitable data. The output device 228 may include one or more displays (e.g., LCD, LED, OLED), illumination devices/components (e.g., lights, LEDs), computing devices (e.g., mobile computing device, POS), and/or other suitable components to output data. It should be understood that although the output device 228 is depicted as a component of the computing device 220, the output device 228 may be otherwise communicatively coupled to the processing platform and/or the computing device 220.

The imaging device 230 may include a network interface 232 (e.g., the network interface 212), a processor 234 (e.g., the processor 214), an I/O interface 236 (e.g., the I/O interface 216), a memory 238 (e.g., the memory 218) and an imaging assembly 240, any and/or all of which may be interconnected via an address/data bus or otherwise communicatively connected.

The network interface 212 may enable communication by the imaging device 230 with the computing device 220 and/or components of the processing platform 200. The processor 234 may be configured to control the imaging assembly 240, execute applications, and/or control overall operation of the imaging device 230. For example, the processor 234 may interact with the memory 238 to obtain, execute, and/or store data and/or instructions (e.g., machine-executable instructions) related to the imaging assembly 240, such as causing the imaging assembly 240 to capture images. The I/O interface 236 may enable receipt of input data (e.g., device configuration data) and/or output data (e.g., image data), e.g., to the computing device 220 via the network 210.

The memory 238 may be accessible by the processor 234 (e.g., via a memory controller), the imaging assembly 240 (e.g., via a controller), and/or other components of the imaging device 230 and/or the processing platform 200. The memory 238 may store image data applications and/or other suitable data.

The memory 238 may store an imaging application 244 that, when executed, causes the imaging device 230 to perform one or more imaging tasks, such as capturing image data, storing and/or transmitting (e.g., to the computing device 220) the image data, etc. For example, the imaging application 244 may include instructions for capturing an image of a barcode.

The imaging device 230 may load or otherwise implement (e.g., via the processor 234, the imaging application 244) barcode scanning job configuration 242 to configure the imaging device 230. In some embodiments, the imaging device 230 may be configured to scan and decode barcodes. The barcode scanning job configuration may be stored (e.g., in the memory 238) as, and/or include, one or more XML files, JSON files, Python code, and/or any other suitable data. The MV or FIS GUI-based application 222, model 224, or otherwise computing device 220 may generate the barcode scanning job configuration 242 to perform a barcode scanning task.

The imaging assembly 240 may include at least one image sensor and a controller. In particular, the at least one image sensor may be configured to capture image data comprising one or more images of the field of view (FOV) of the imaging device 230, e.g., a FOV including the object 108 on the conveyor belt 106. The image sensor may be and/or include a charge-coupled device (CCD) sensor, a complementary metal-oxide semiconductor (CMOS) sensor, a one-dimensional array of addressable image sensors, a two-dimensional array of addressable image sensors, a monochrome sensor, a color sensor, and/or any other suitable image sensor. Depending on the implementation, the image sensor may include a color sensor such as a vision camera in addition to and/or as an alternative to the monochrome sensor. The imaging assembly 240 may include one or more subcomponents, such as one or more controllers, and/or one or more imaging shutters (e.g., electronic and/or mechanical shutters configured to expose/shield the imaging sensor from the external environment). The one or more controllers may control and/or perform operations of the imaging assembly 240. The controller, the processor 234, and/or other suitable component may be configured to control the imaging assembly 240. The imaging assembly may include and/or be communicatively coupled to an illumination source (e.g., the illumination source) configured to emit illumination during a (predetermined) period corresponding to capturing image data via the imaging assembly 240, such as white light illumination, particular wavelengths (e.g., red wavelengths, IR) to suit the requirements of the imaging assemblies, etc. The imaging device 230 may have one or more operational parameters associated with illumination, a focal setting (e.g., focal distance to the object 108), an image sensor setting (e.g., contrast, resolution), image processing (e.g., image OCR, cropping, stitching), and/or other operational parameters. An adjustment or otherwise change may be made to one or more of the operation parameters of the imaging device 230 via the imager configuration data.

The imaging assembly 240 may be configured with the barcode scanning job configuration 242 to capture image data which may comprise one or more images of a target object within the FOV, including, for example, packages, items, labels, and/or other target objects, which some examples includes merchandise available at retail/wholesale store, facility, or the like. The target objects may or may not include indicia, such as a barcode, a QR codes, a digital watermark, and/or other such indicia. The processor 234, the imaging application 244, the computing device 220, and/or other suitable component(s) of the processing platform 200 may analyze the captured image data of target objects and/or indicia passing through a FOV of the imaging assembly 240. For example, a barcode may be decoded and output in a specific format.

In operation, a computing device 220 may receive a system instruction file and a current barcode scanning job configuration 242. A user may interact with the computing device 220 via an I/O interface 216 to input a prompt to the computing device 220. The MV or FIS GUI-based application 222 may process the system instruction file, prompt, and the current barcode scanning job configuration 242 using the machine learning model 226 to generate a response to the prompt and/or a new barcode scanning job configuration, and update the barcode scanning job configuration 242 based on the new barcode scanning job configuration. The response to the prompt may be displayed in an output device 228 and the barcode scanning job configuration may be transmitted to the imaging device 230 to configure and control the imaging device 230.

Example Imaging Device

Figure 3:
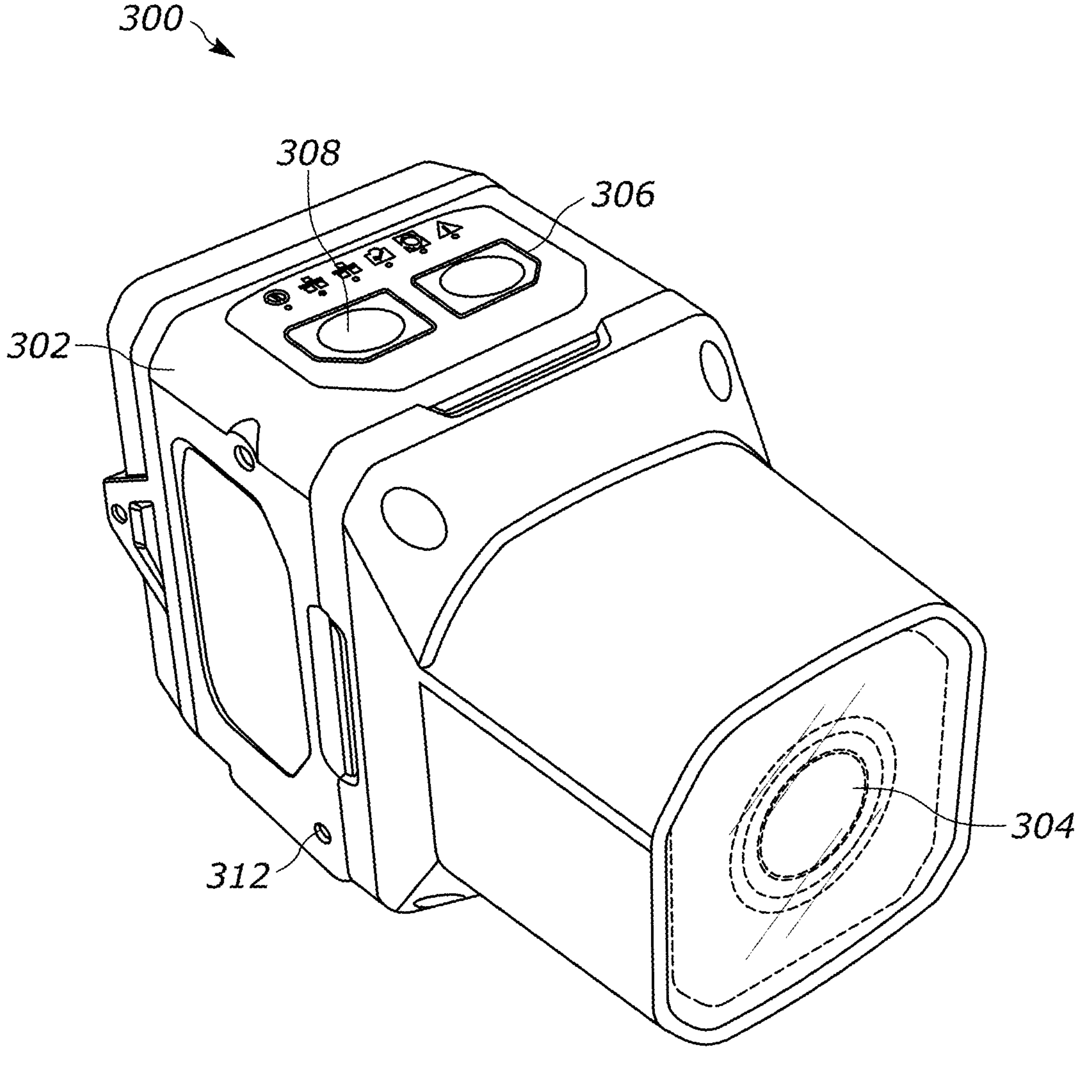
FIG. 3 depicts an exemplary imaging device, in accordance with embodiments described herein.

FIG. 3 is a perspective view of an example imaging device 300 that may be any of the imaging devices 102*a*-

102*d*, 104*a*-104*d* of FIG. 1. The machine vision imaging device may be implemented as an imager for machine vision applications in accordance with embodiments described herein. The machine vision imaging device 300 includes a housing 302, an imaging aperture 304, a user interface label 307, a dome switch/button 308, and mounting point(s) 312. In some embodiments, the imaging device 300 may be a fixed industrial scanner.

Example Machine Learning Model

Figure 4:
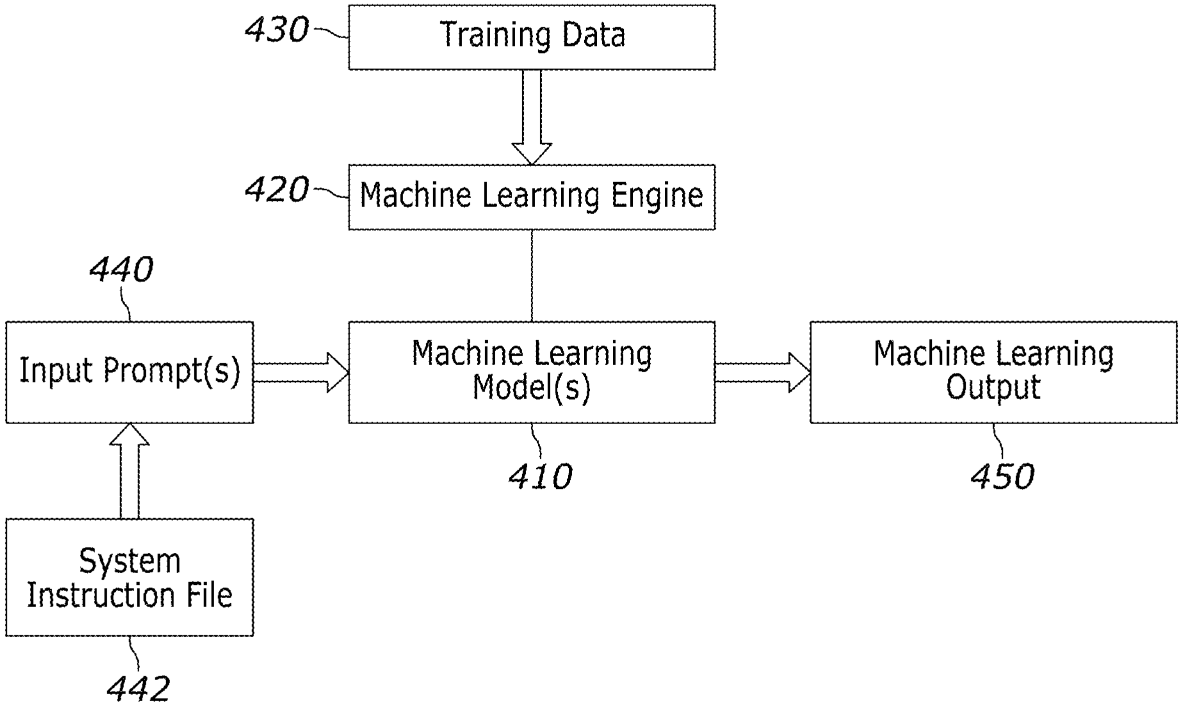
FIG. 4 depicts a flow diagram for an exemplary machine learning model training and operation, in accordance with embodiments described herein.

FIG. 4 illustrates a flow diagram for example training and operation of a machine learning model 410 (e.g., the machine learning model 224), according to some embodiments. The example training and/or operation of the machine learning model 410 may be performed by the computing device 112 of FIG. 1 and/or computing device 220 of FIG. 2.

A machine learning engine 420 may include one or more hardware and/or software components to obtain, create, (re)train, fine-tune, and/or store one or more machine learning models, such as the machine learning model 410. To train the machine learning model 410, the machine learning engine 420 may use training data 430. A computing device 112 or 220 may obtain and/or have available one or more types of training data 430 (e.g., training data stored in the memory 224 or in an external database). In one aspect, at least some of the training data 430 may be labeled to aid in (re)training and/or fine-tuning the machine learning model 410. During training of the machine learning model 410 by the machine learning engine 420, the machine learning model 410 may be configured to process the training data 430 to learn associations and relationships in the training data 430.

In some embodiments, the machine learning engine 420 updates the training data 430 as needed, e.g., to include new data. Such data may be stored as updated training data 430. Subsequently, the machine learning model 410 may be retrained based upon the updated training data 430, or the new portions thereof, which may cause the machine learning model 410 to improve over time. For example, the machine learning model 410 may improve at generating barcode scanning job configurations.

In some embodiments, the machine learning model 410 may be a generative model and/or include generative functionality allowing the machine learning model 410 to generate new content, such as images, text, or other forms of data, that is similar to, or inspired by, existing examples.

In at least some aspects, the machine learning model 410 may generate responses to requests using natural language. In some embodiments, an input prompt 440 may be a natural language prompt that includes a question about an existing and/or current MV or FIS barcode scanning job configuration and/or a request to generate a new MV or FIS barcode scanning job configuration. The machine learning model 410 may answer questions about the existing and/or current MV or FIS barcode scanning job configuration and/or generate a new MV or FIS barcode scanning job configuration responsive to the natural language input prompt 440. For example, a natural language prompt may be a question such as "What is my current config?" or a request such as "Change the config to only output the first 4 characters of each decode."

In some embodiments, a system instruction file may be included with input prompt 440. The system instruction file 442 may include information to guide the MV or FIS GUI-based application. The system instruction file may be an immutable document. In some embodiments, the system instruction file may include company data (e.g., a company name), a MV or FIS application data (e.g., a name of the FIS/MV application, a feature of the MV or FIS application, a description of a graphical user interface (GUI) layout and controls of the MV or FIS application), and/or a description of tasks to be performed by the machine learning model. In some embodiments, the input prompt 440 may include example natural language prompts and example portions of executable code and/or data formats corresponding to the example natural language prompts to guide the machine learning model 410 in generating MV or FIS barcode scanning job configurations.

The present techniques may include language modeling via one or more LLMs wherein one or more models (e.g., deep learning models) are trained by processing token sequences using an LLM architecture. For example, a transformer architecture may be used to process a sequence of tokens. The transformer model may include a plurality of layers including self-attention and feed-forward neural networks. The transformer architecture may enable the model to learn contextual relationships between the tokens, and to predict the next token in a sequence, based upon the preceding tokens. During training, the model is provided with the sequence of tokens and it learns to predict a probability distribution over the next token in the sequence. The training process may include updating one or more model parameters (e.g., weights or biases) using an objective function that minimizes the difference between the predicted distribution and a true next token in the training data.

Alternatives to the transformer architecture may include recurrent neural networks, long short-term memory networks, gated recurrent networks, convolutional neural networks, recursive neural networks, and other modeling architectures.

In some embodiments, the machine learning engine 420 trains the machine learning model 410 using the training data 430 to generate the output 450 based on receiving the input prompt 440. In some embodiments, the input prompt 440 may be a natural language prompt and/or include a natural language query. In some embodiments, the input prompt 440 may be received at a computing device (e.g., computing device 112, 220) implementing the machine learning model 410. Once trained, the machine learning model 410 may perform operations the input prompt 440 to produce a desired output 450, as discussed above. In one aspect, the machine learning model 410 is loaded at runtime from a memory or external database (e.g., the model 410 loaded by the machine learning engine 420 from the memory 218, or an external database). The server and/or machine learning engine 420 may obtain the input prompt 440 (e.g., from an I/O interface 216 in FIG. 2), and the machine learning engine 420 may provide the input prompt 440 to the trained machine learning model 410 as an input, for the machine learning model 410 to generate the output 450.

The machine learning model 410 may generate a MV or FIS barcode scanning job configuration comprising the output 450. For example, in response to an input prompt "Output all decodes in the same order they are output, with a comma between each decode," the machine learning model 410 may generate an instruction for an MV or FIS GUI-based application to decode a barcode scanned by the imaging devices 102*a-d*, 104*a-d* and output the barcode information in a format corresponding to the input prompt. The machine learning model 410 may generate data that updates the GUI of the MV or FIS GUI-based application to correspond to the barcode scanning job. For example, in response to an input prompt "Output all decodes in the same order they are output, with a comma between each decode", the machine learning model 410 may generate data in a JSON format that updates the UI control for setting the output order of decodes and the UI control for including a comma between each decode, such as the UI controls depicted in FIG. 5. In some embodiments, machine learning model 410 may generate a difference between the current MV or FIS barcode scanning job configuration and the new MV or FIS barcode scanning job configuration, which may be displayed in an output device (e.g., output device 228).

Example GUI Components and AI/ML Assistant

Figure 5:
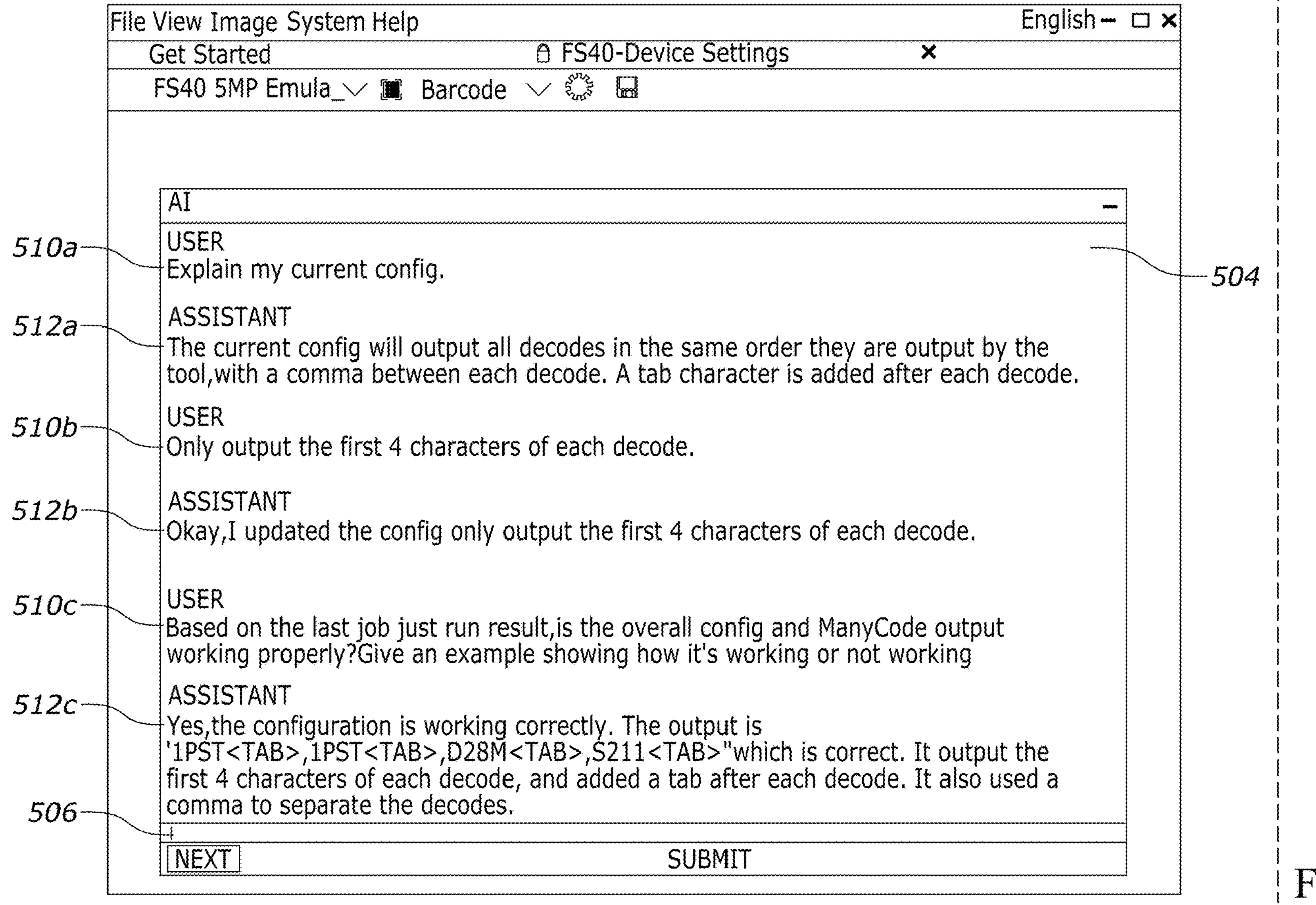
FIG. 5 depicts an exemplary artificial intelligence/machine learning assistant and portions of an exemplary graphical user interface, in accordance with embodiments described herein.

FIG. 5 depicts an example of a GUI component and an example artificial intelligence assistant of a GUI of an MV or FIS GUI-based computer application. The GUI of an MV or FIS GUI-based application may include an advanced filtering and formatting pane 502 that may be used to filter and format the output of a barcode scanning job and an artificial intelligence or assistant 504.

Instead of adjusting the settings on the advanced filtering and formatting pane 502 directly, a user may use the artificial intelligence assistant 504 to adjust the settings in the advanced filtering and formatting pane 502. A user may interact with an I/O component (e.g., I/O interface 216) to input a prompt (e.g., prompts 510*a*-510*c*) in the input field 506 of the artificial intelligence assistant 504. The artificial intelligence assistant may use a machine learning model such as the machine learning model 224, 410 to generate an output response (e.g., responses 512*a*-510*c*). The input prompt may be a request for information about the current MV or FIS barcode scanning job configuration. For example, a user may input "Explain my current config" as a prompt (prompt 510*a*). The artificial intelligence assistant 504 may generate an output response "The current config will output all decodes in the same order they are output by the tool, with a comma between each decode. A tab character is added after each decode" (response 512*a*).

In some embodiments, the prompt may include instructions to modify a barcode scanning job configuration or generate a new barcode scanning job configuration. For example, prompt 510*b* requests "Only output the first 4 characters of each decode." The artificial intelligence assistant 504 may output a response 512*b*. The artificial intelligence assistant 504 may also generate a new barcode scanning job configuration and/or update the current barcode scanning job configuration. The artificial intelligence assistant 504 may generate data that renders the updated settings corresponding to the new barcode scanning job configuration in the GUI of the MV or FIS GUI-based application. For example, in response to the prompt 510*b* "Only output the first 4 characters of each decode," the artificial intelligence assistant 504 may generate a new barcode scanning job configuration that only outputs the first 4 characters of each decode in the form of a JSON object that renders (e.g., via a GUI generation module 224) the changes in the advanced filtering and formatting pane 502 in the GUI of the MV or FIS GUI-based application. The changes may be rendered in the GUI instantly (e.g., in real time or near real-time).

In some embodiments, the artificial intelligence assistant 504 may validate the updated barcode scanning job configuration. For example, input prompt 510*c* asks "Based on the last job run result, is the overall config and ManyCode output working properly? Give me an example showing how it's working or not working." The artificial intelligence assistant 504 may validate that the output of the barcode scanning job configuration corresponds to the updated barcode scanning job configuration. For example, the artificial intelligence assistant 504 generates the response 512*c*, "Yes, the configuration is working correctly" with an example and explanation of why it is correct. In some embodiments, if the output of the barcode scanning job configuration is incorrectly formatted and does not correspond to the updated barcode scanning job configuration, the artificial intelligence assistant 504 may generate a corrected barcode scanning job configuration. The corrected barcode scanning job configuration may be rendered in the GUI of the MV or FIS GUI-based application. For example, changes to filtering and formatting options may appear in the advanced filtering and formatting pane 502.

In some embodiments, the artificial intelligence assistant 504 may generate a difference between the current MV or FIS barcode scanning job configuration and the new MV or FIS barcode scanning job configuration. The difference may be rendered in the GUI, and/or in an output device (e.g., output device 228).

It should be appreciated that, while an advanced filtering and formatting pane 502 is shown in FIG. 5, the GUI of an MV or FIS GUI-based application may include any suitable settings (e.g., user interface controls) for an MV or FIS barcode scanning job. For example, settings may include symbologies (e.g., barcode formats such as I25, D25, QR, UPC/EAN, Code 93, DotCode, Code 128, Code 39, Data Matrix, PDF-417, etc.), output string formatting, and other rules. Various settings may be selected to configure a barcode scanning job.

Example Method

Figure 6:
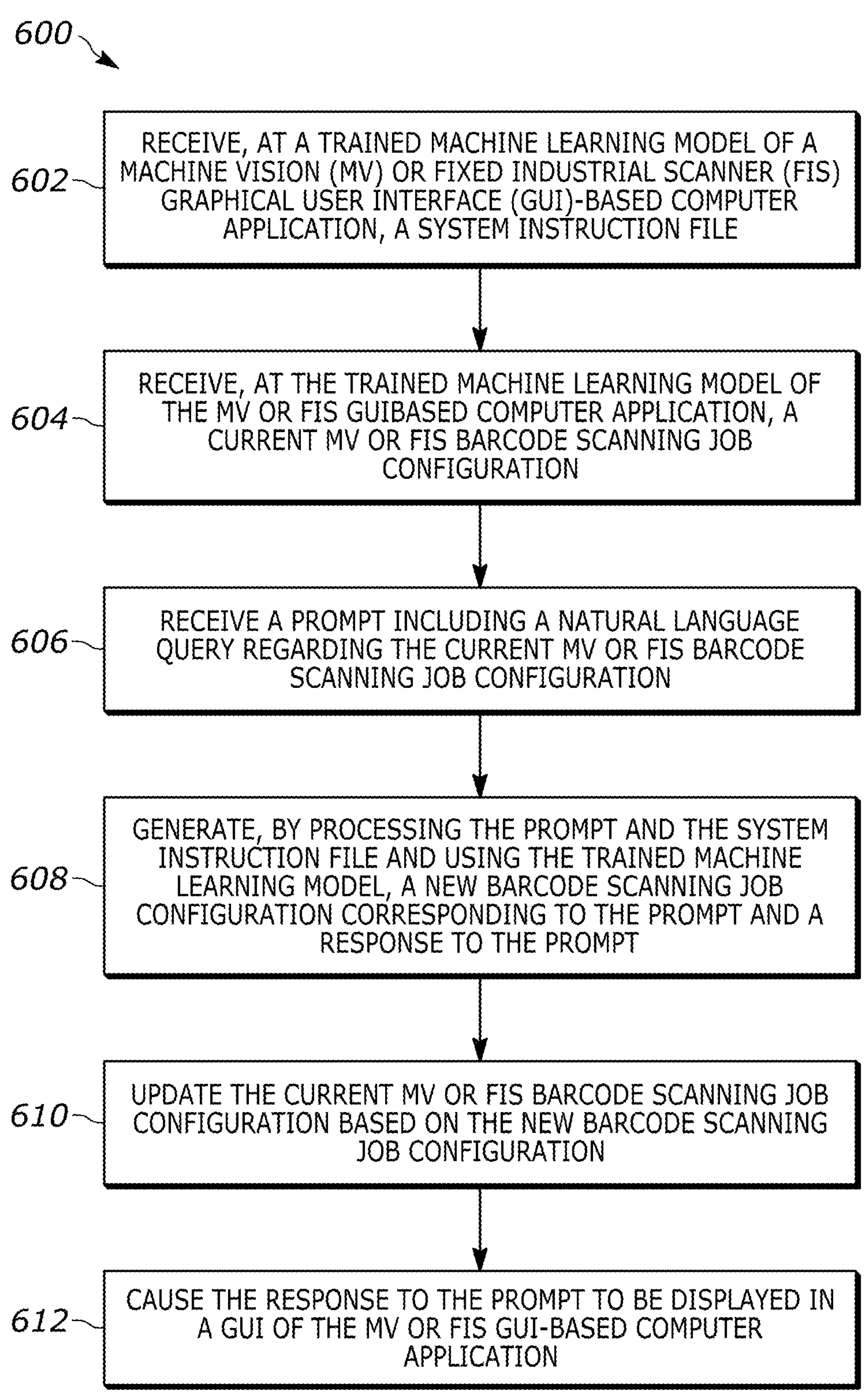
FIG. 6 depicts a flow diagram of an example method for controlling an imaging device with generative artificial intelligence, in accordance with embodiments described herein.

FIG. 6 depicts a flow diagram of an exemplary computer-implemented method for controlling an imaging device, according to some embodiments. One or more blocks of the method 600 may be implemented as a set of instructions stored on a computer-readable memory and executable on one or more processors. The method 600 may be implemented via one or more local or remote processors such as the processor 214, computing devices such as the 112 or 220, systems such as the environment 100, and/or other electronic or electrical components, which may be communicatively coupled with one another.

The method 600 may include receiving, at a trained machine learning model of a Machine Vision (MV) or Fixed Industrial Scanner (FIS) graphical user interface (GUI)-based computer application, a system instruction file at block 602. In some embodiments, the system instruction file may include company data, an MV or FIS application data, or a description of tasks to be performed by the machine learning model. In some embodiments, the MV or FIS application data may include a name of the MV or FIS application, a feature of the MV or FIS application, a description of a graphical user interface (GUI) layout of the MV or FIS application.

At block 604, the method 600 may include receiving, at the trained machine learning model of the MV or FIS GUI-based computer application, a current MV or FIS barcode scanning job configuration. In some embodiments, the trained machine learning model may be a large language model (LLM) or a multi-modal machine learning model. In some embodiments, the trained machine learning model may be fine-tuned according to the system instruction file.

At block 606, the method 600 may include receiving a prompt including a natural language query regarding the current MV or FIS barcode scanning job configuration. In some embodiments, the natural language query may include a query to evaluate one or more proposed changes to a barcode scanning job configuration and/or a query to modify the current MV or FIS barcode scanning job configuration. In some embodiments, the method 600 may include uploading one or more images to the MV or FIS GUI-based application. The prompt may reference the one or more uploaded images, which may include a barcode, optical character recognition (OCR) text, and/or a machine vision part.

At block 608, the method 600 may include generating, by processing the prompt and the system instruction file and using the trained machine learning model, a new barcode scanning job configuration corresponding to the prompt and a response to the prompt. In some embodiments, the new MV or FIS barcode scanning job configuration may be in JavaScript Object Notation (JSON) format.

In some embodiments, the method 600 may include generating a difference between the current MV or FIS barcode scanning job configuration and the new MV or FIS barcode scanning job configuration using the trained machine learning model. The difference may be rendered in the GUI of the MV or FIS GUI-based computer application, or in the output device.

At block 610, the method 600 may include updating the current MV or FIS barcode scanning job configuration based on the new barcode scanning job configuration. At block 612, the method 600 may include causing the response to the prompt to be displayed in a GUI of the MV or FIS GUI-based computer application.

In some embodiments, the method 600 may include receiving, at the trained machine learning model, previous natural language queries and previous responses. The previous natural language queries and the previous responses may be used by the trained machine learning model to generate an additional response.

In some embodiments, the method 600 may further include updating one or more settings displayed in the GUI of the MV or FIS GUI-based computer application. The new barcode scanning job configuration may be instantly updated to correspond to the updated settings displayed in the GUI of the MV or FIS GUI-based computer application.

In some embodiments, the method 600 may include receiving a barcode image and executing the updated barcode scanning job to process the barcode image to generate result data. The trained machine learning model may validate that the result data is responsive to the updated barcode scanning job configuration. In some embodiments, if the result data is not responsive to the updated barcode scanning job configuration, the trained machine learning model may generate a corrected MV or FIS barcode scanning job configuration file. The MV or FIS barcode scanning job configuration may be updated based on the corrected MV or FIS barcode scanning job configuration file, and the GUI of the MV or FIS GUI-based computer application may be instantly updated to correspond to the corrected MV or FIS barcode scanning job configuration file.

Additional Considerations

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their respective entireties, for all purposes. Aspects of the embodiments can be modified if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for controlling an imaging device comprising:

receiving, at a trained machine learning model of a Machine Vision (MV) or Fixed Industrial Scanner (FIS) graphical user interface (GUI)-based computer application, a system instruction file;

receiving, at the trained machine learning model of the MV or FIS GUI-based computer application, a current MV or FIS barcode scanning job configuration;

receiving, by one or more processors, a prompt including a natural language query regarding the current MV or FIS barcode scanning job configuration;

generating, by processing the prompt and the system instruction file and using the trained machine learning model, a new barcode scanning job configuration corresponding to the prompt and a response to the prompt;

updating, by the one or more processors, the current MV or FIS barcode scanning job configuration based on the new barcode scanning job configuration; and causing, by the one or more processors, the response to the prompt to be displayed in a GUI of the MV or FIS GUI-based computer application;

receiving, by the one or more processors, a barcode image from an imaging device; executing, by the one or more processors, the updated barcode scanning job to process the barcode image to generate result data; and validating, by the one or more processors and using the trained machine learning model the result data, that the result data is responsive to the new barcode scanning job configuration.

2. The method of claim 1, wherein the natural language query includes at least one of a query to evaluate one or more proposed changes to a barcode scanning job configuration or a query to modify the current FIS/MV barcode scanning job configuration.

3. The method of claim 1, wherein the trained machine learning model is one of a large language model (LLM) or a multi-modal machine learning model.

4. The method of claim 1, wherein the new MV or FIS barcode scanning job configuration is in JavaScript Object Notation (JSON) format.

5. The method of claim 1, further comprising:

generating, by the one or more processors and by using the trained machine learning model, a difference between the current MV or FIS barcode scanning job configuration and the new MV or FIS barcode scanning job configuration; and causing, by the one or more processors, the difference to be rendered in the GUI of the MV or FIS GUI-based computer application, or in the output device.

6. The method of claim 1, wherein the system instruction file includes one or more of company data, a MV or FIS application data, or a description of tasks to be performed by the machine learning model.

7. The method of claim 6, wherein the MV or FIS application data includes one or more of a name of an MV or FIS application, a feature of the MV or FIS application, or a description of a graphical user interface (GUI) layout of the MV or FIS application.

8. The method of claim 1, further comprising:

receiving, at the trained machine learning model, one or more previous natural language queries and one or more previous responses, wherein the one or more previous natural language queries and the one or more previous responses to be used by the trained machine learning model to generate an additional response.

9. The method of claim 1, wherein the trained machine learning model is fine-tuned according to the system instruction file.

10. The method of claim 1, wherein the result data is not responsive to the new barcode scanning job configuration, further comprising: generating, by the one or more processors and using the trained machine learning model, a corrected MV or FIS barcode scanning job configuration file; and updating, by the one or more processors, the MV or FIS barcode scanning job configuration based on the corrected MV or FIS barcode scanning job configuration file; and instantly updating, by the one or more processors, the GUI of the MV or FIS GUI-based computer application to correspond to the corrected MV or FIS barcode scanning job configuration file.

11. The method of claim 1, wherein updating the current MV or FIS barcode scanning job configuration comprises:

instantly updating, by the one or more processors, the GUI of a MV or FIS GUI-based computer application to correspond to the new MV or FIS barcode scanning job configuration.

12. The method of claim 1, further comprising:

updating, by the one or more processors, one or more settings displayed in the GUI of the MV or FIS GUI-based computer application; and instantly updating, by the one or more processors, the new barcode scanning job configuration to correspond to the updated settings displayed in the GUI of the MV or FIS GUI-based computer application.

13. The method of claim 1, further comprising:

uploading, to the MV or FIS GUI-based computer application, one or more images, wherein the prompt references the one or more images.

14. The method of claim 13, wherein the one or more images includes one or more of a barcode, optical character recognition (OCR) text, or a machine vision part.

* * * * *